United States Patent
Englund

(10) Patent No.: US 9,839,963 B2
(45) Date of Patent: Dec. 12, 2017

(54) CLAMPING DEVICE

(71) Applicant: SANDVIK INTELLECTUAL PROPERTY AB, Sandviken (SE)

(72) Inventor: Kjell Englund, Valbo (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 77 days.

(21) Appl. No.: 14/826,450

(22) Filed: Aug. 14, 2015

(65) Prior Publication Data

US 2016/0052063 A1 Feb. 25, 2016

(30) Foreign Application Priority Data

Aug. 19, 2014 (EP) .................................. 14181384

(51) Int. Cl.
*B23B 31/26* (2006.01)
*B23B 29/04* (2006.01)
(Continued)

(52) U.S. Cl.
CPC .......... *B23B 31/265* (2013.01); *B23B 29/046* (2013.01); *B23B 31/4033* (2013.01);
(Continued)

(58) Field of Classification Search
CPC ..... B23B 31/26; B23B 131/265; B23B 31/24; B23B 31/201; B23B 31/4033;
(Continued)

(56) References Cited

U.S. PATENT DOCUMENTS 3,301,108 A * 1/1967 Heiner .................... B23B 31/40
279/2.12
5,340,248 A 8/1994 Engbergs
(Continued)

FOREIGN PATENT DOCUMENTS

DE 19818148 A1 10/1999
DE 10241860 A1 * 3/2004 ........... B23B 29/046
(Continued)

*Primary Examiner* — Eric A Gates
*Assistant Examiner* — Chwen-Wei Su
(74) *Attorney, Agent, or Firm* — Corinne R. Gorski

(57) ABSTRACT

A clamping device for releasably holding a tool holder shank is formed with an engagement bore in a rear end, and includes a housing having a bore in a forward end for receiving the tool holder shank, a drawbar reciprocally movable inside the housing and which in a forward end is provided with engagement means arranged to engage with an engagement formation inside the engagement bore of the tool holder shank, and which is formed with a drawbar aperture extending through the drawbar in a transverse direction of the same, and a cam shaft extending through the drawbar aperture. The cam shaft includes three cam formations and more precisely first and second spaced apart cam formations, which are journalled in seating apertures in the housing on opposite sides of the drawbar, and an intermediate third cam formation located between the first and second cam formations and positioned within the aperture of the drawbar. The drawbar is insertable into the bore from the forward end.

4 Claims, 7 Drawing Sheets

(51) Int. Cl.
*B23B 31/40* (2006.01)
*B23B 31/20* (2006.01)

(52) U.S. Cl.
CPC ......... *B23B 31/207* (2013.01); *B23B 31/4006* (2013.01); *B23B 2231/24* (2013.01); *B23B 2260/02* (2013.01); *B23B 2260/034* (2013.01); *B23B 2260/12* (2013.01); *Y10T 279/1037* (2015.01); *Y10T 279/17111* (2015.01); *Y10T 409/309464* (2015.01)

(58) Field of Classification Search
CPC ............ B23B 2231/24; B23B 2231/40; B23B 2260/02; B23B 31/207; B23B 31/4006; B23B 2260/034; B23B 29/046; Y10T 279/17111; Y10T 279/1037; Y10T 279/1008; Y10T 279/1012; Y10T 409/304032; Y10T 409/309464
See application file for complete search history.

(56) References Cited

U.S. PATENT DOCUMENTS 5,452,631 A * 9/1995 Erickson ............... B23B 29/046
                                                        409/234
5,851,091 A    12/1998 Klement

FOREIGN PATENT DOCUMENTS

| DE | 102010052884 A1 | 6/2012 | | |
|----|---|---|---|---|
| EP | 2641679 A2 * | 9/2013 | ......... | B23B 31/1077 |
| JP | 2008110456 A | 5/2008 | | |
| WO | 2005032747 A1 | 4/2005 | | |

* cited by examiner

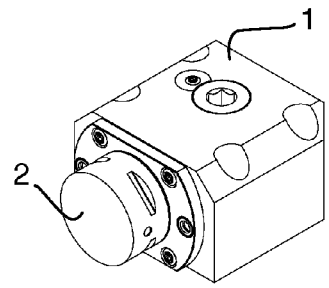
Fig 1
Prior art
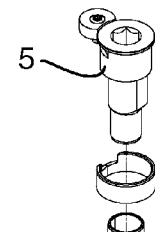
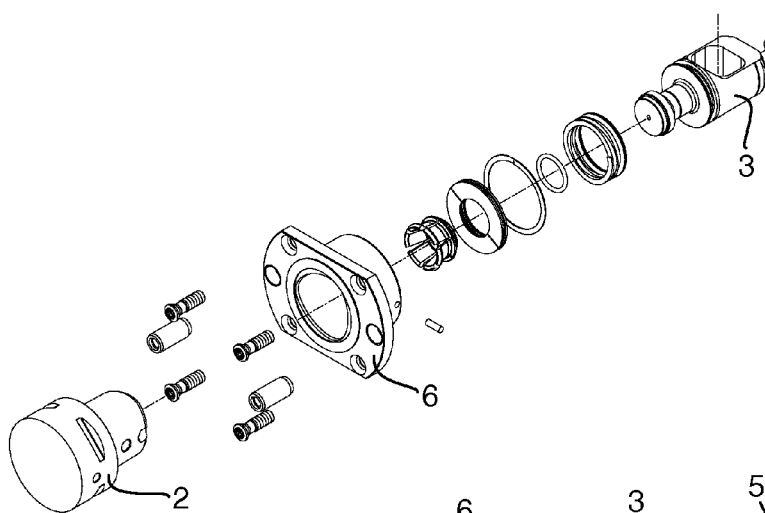
Fig 2
Prior art
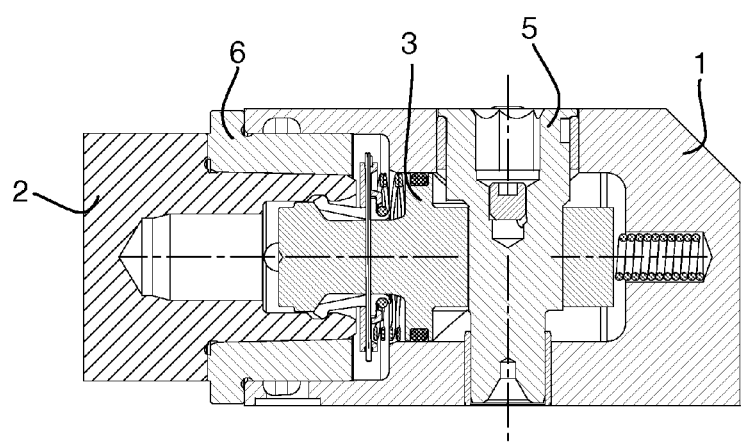
Fig 3
Prior art

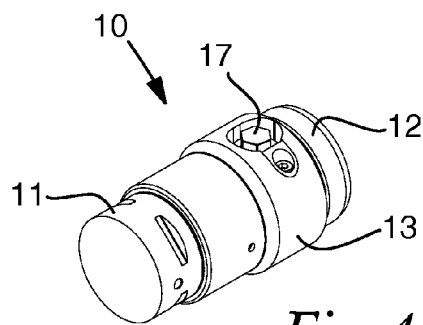
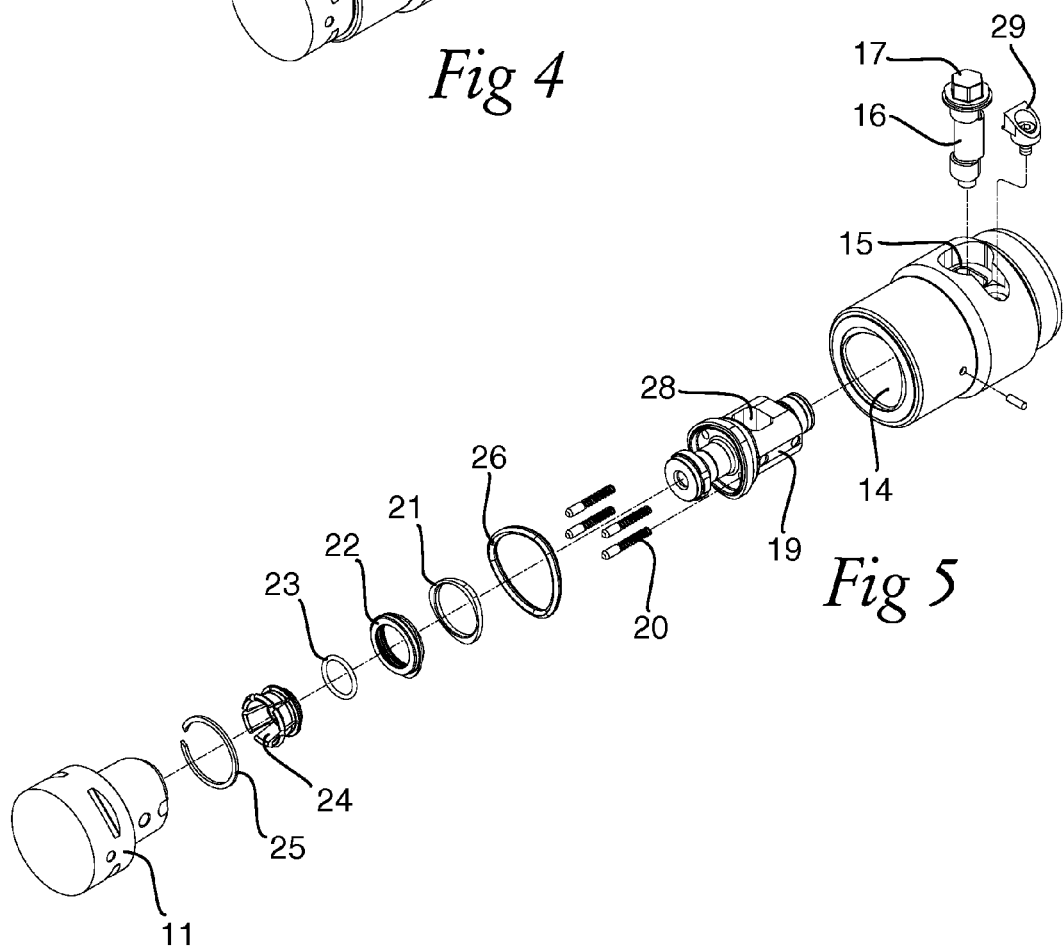

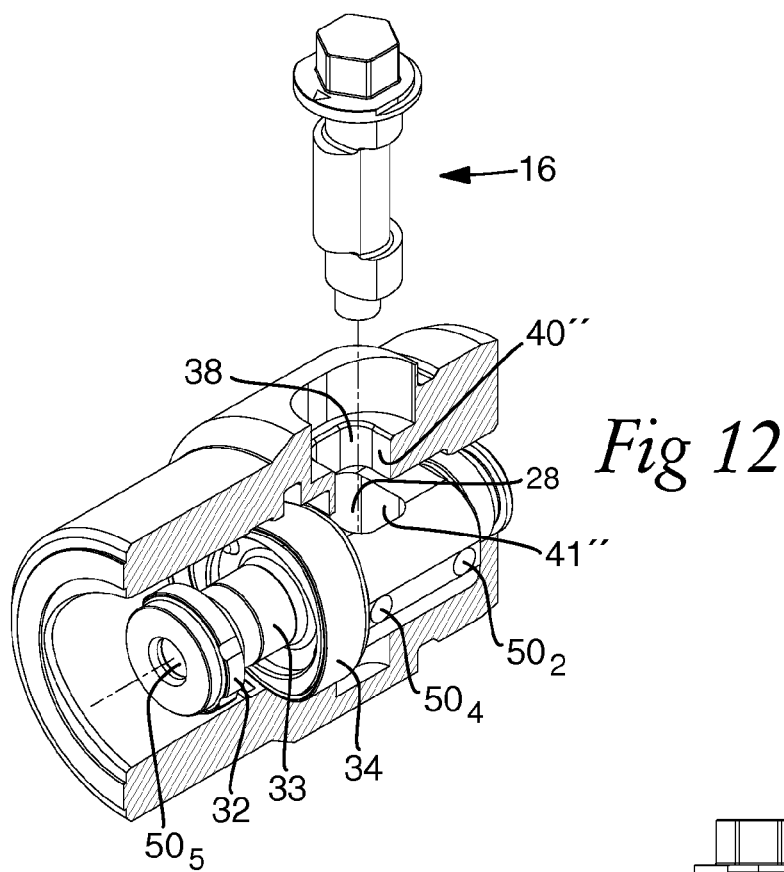
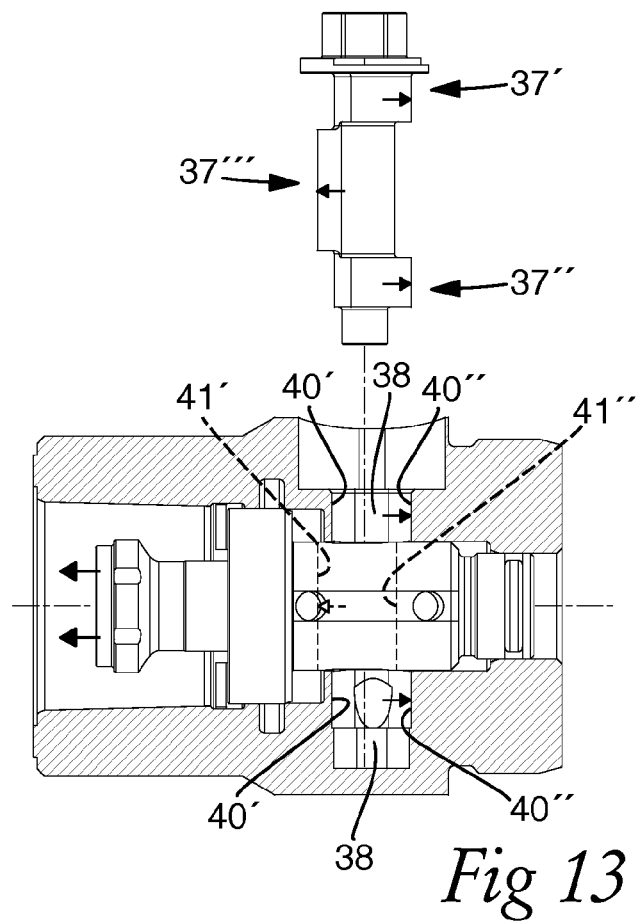
Fig 12
Fig 13

CLAMPING DEVICE

RELATED APPLICATION DATA

This application claims priority under 35 U.S.C. §119 to EP Patent Application No. 14181384.0, filed on Aug. 19, 2014, which the entirety thereof is incorporated herein by reference.

TECHNICAL FIELD

The present disclosure relates to a clamping device for releasably holding a tool holder shank formed with an engagement bore in a rear end, the clamping device including a housing having a forwardly facing surface and a bore intersecting the forwardly facing surface and extending rearwardly therefrom for receiving the tool holder shank; a drawbar being mounted reciprocally movable inside the housing and which in a forward end is provided with engagement means which is adapted to go into engagement with an engagement formation inside the engagement bore of the tool holder shank, the drawbar being in a rear portion formed with a drawbar aperture extending through the drawbar in a transverse direction in relation to a longitudinal axis of the same; and a cam shaft extending through the drawbar aperture and comprising a cam formation, wherein the cam shaft is rotatably journalled in the housing and adapted to impart an axial displacement to the drawbar in relation to the housing by means of the cam formation when rotating the cam shaft.

BACKGROUND

Clamping devices are well known and widely used within the manufacturing industry for holding different kinds of tools for machining of work pieces of various materials. The clamping device may optionally be carried on a rotatable spindle, for holding e.g. a drill or a milling tool, or be unrotatable for holding e.g. a lathe tool.

One great advantage with a clamping device of this kind is that it allows for a quick clamping of the tool, simply by rotating the cam shaft by about 100° to 180°, which has to effect that the tool will be drawn by a large force into the mounting bore of the housing and thereby be securely held by the clamping device. Also, release of the tool can be easily and rapidly performed by rotating the cam shaft in the reverse direction. Normally, the bore of the housing, as well as the tool holder shank are also made slightly conical such that they are tapering in an axial direction rearward from the tool. In this way, the connection between the tool and the clamping device also can be made totally free from any play which has to effect that the tool will be held in an exact position which allows for high precision machining by means of the tool.

However, one disadvantage with prior art clamping devices of this kind is that the drawbar is made with a comparatively large cross-sectional dimension such that it cannot, with the desirable cross sectional measures of the tool holder shanks frequently being used, be inserted through the bore of the housing from its forward end. The reason why the drawbar has to be made with such a large cross-sectional dimension is that the drawbar aperture has to accommodate a cam shaft having a cam formation of a sufficient size in order to provide the desired displacement of the cam shaft and the desired force reduction for the operator performing the rotation of the cam shaft during clamping and releasing.

However, in order to ensure sufficient tensile strength of the drawbar to withstand the desirable forces by which the tool holder shank is drawn into the shank bore, the remaining leg portions of the drawbar surrounding the drawbar aperture must be made with a sufficient cross-sectional dimension.

An example of a prior art design of a clamping device will be described more in detail in connection with the hereinafter detailed description. Accordingly, in order to position the drawbar in place when assembling the clamping device, the drawbar has up to the present been inserted from the rear end of the clamping device or a shank bore sleeve has been mounted in the forward end of the clamping device after that the drawbar has been inserted into the housing from the forward end. One consequence of this is that the overall dimensions of the clamping device cannot be made as small and slim as desired. Another consequence is that the clamping device will comprise extra mounting details which will render the clamping device more expensive to manufacture, both in respect of material costs and costs for performing the assembling.

SUMMARY

It is an aspect of the disclosure to provide a clamping device by which the drawbar is insertable into the housing through the bore of the housing from its forward end.

Accordingly, the drawbar can be made with an overall cross-sectional dimension which is so small such that it can be inserted through the housing bore from the forward end of the housing, which is accomplished in that, instead of a single continuous cam formation, as in prior art clamping devices, the cam shaft is provided with three cam formations and more precisely first and second spaced apart cam formations, which are journalled in seating apertures in the housing on opposite sides of the drawbar and which are identically shaped and positioned in relation to each other, and an intermediate third cam formation located between the first and second cam formations which is angularly displaced in relation to the first and second cam formations and positioned within the aperture of the drawbar.

Each of the cam formations includes a first cam surface and a second cam surface, wherein the first cam surfaces of the first and second cam formations being operable to displace the cam shaft rearward by acting on a forward surface of the seating apertures whereas the first cam surface of the third cam formation being operable to displace the drawbar rearward by acting on a rear surface of the drawbar aperture, and wherein the second cam surfaces of the first and second cam formations being operable to displace the cam shaft forward by acting on a rear surface of the seating apertures whereas the second cam surface of the third cam formation being operable to displace the drawbar forward by acting on a forward surface of the drawbar aperture. In this way, the overall cross-sectional dimension of the cam shaft can be decreased since the first and seconded cam formations are oppositely directed in relation to the third cam formation which has to result that the size of each cam formation can be decreased since the displacing action of the first and second cam formations will add to the displacing action of the third cam formation. In this way also the drawbar aperture as well as the overall cross sectional dimension of the drawbar can be decreased.

It is apparent that the disclosure can be varied and modified in many different ways. For example, in the hereinafter described and illustrated exemplary embodiment, the mounting bore of the clamping device is conically formed and has a somewhat "triangular" or polygonal shape in cross section for clamping a tool holder having a similarly shaped mounting shank. However, the mounting bore could also have a different shape for clamping other types of mounting shanks. Also the drawbar of the exemplary embodiment is formed with a "triangular" or polygonal cross section of a large size portion adapted to slide within the bore in a sealed fashion but could of course have another cross sectional shape, e.g. as a cylinder with a circular cross section. Moreover, in the exemplary embodiment the first and second cam formations of the cam shaft are identical shaped as the third cam formation, though being angular displaced by 180°. However, the first and second cam formations could also have a different shape in relation to the third cam formation.

According to a second aspect, it is also an object to provide a clamping device having a shorter length than prior art clamping devices. This is achieved inter alia by positioning the compression springs adapted to push the coupling mechanism in a forward direction within spring bores formed in the longitudinal direction of the drawbar. In this way no additional space for accommodating a compression spring has to be provided external of the drawbar.

In the description and claims throughout this application the term "forward" is used to indicate a direction or position towards the outer opening of the mounting bore through which the tool holder shank is inserted during clamping. In analogy, the terms "rear" or "rearward" are used to indicate a direction or position away from the outer opening of the mounting bore.

BRIEF DESCRIPTION OF THE DRAWINGS

An embodiment of a prior art clamping device as well as an exemplary embodiment of a clamping device according to the disclosure, will hereinafter be described with reference to the accompanying drawings, in which:

FIGS. 1-3 illustrate an embodiment of a prior art clamping device.

FIG. 4 is a perspective view of a clamping device according to the disclosure coupled to a tool holder.

FIG. 5 is an exploded perspective view according to FIG. 4.

FIG. 12 is a partly cut-through and exploded perspective view of the housing, the drawbar and the cam shaft of the clamping device.

FIG. 13 is a longitudinal section according to FIG. 12.

DETAILED DESCRIPTION

Figure 6:
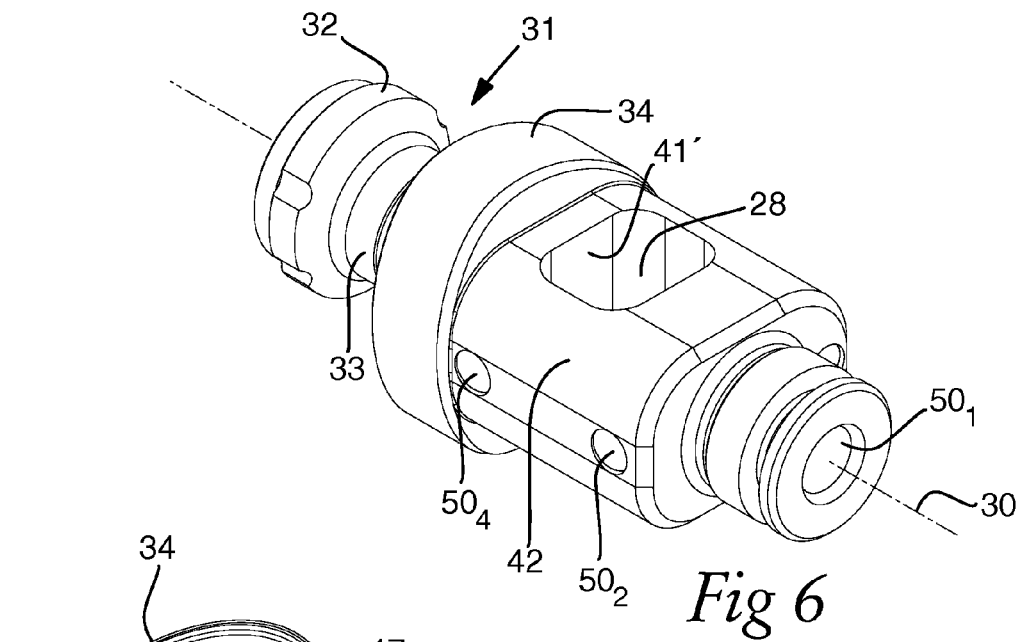
FIG. 6 is a perspective view of a drawbar of the clamping device.

A prior art clamping device will briefly be described with reference to FIGS. 1-3. This prior art clamping device is of an unrotatable kind, which is adapted to hold, for ex., a lathe tool. As evident from FIG. 1, an outer housing of the clamping device 1 is generally box-shaped and is shown connected to a schematically illustrated tool holder 2. FIG. 2 is an exploded perspective view of the clamping device and the tool holder showing all the separate components comprised in the clamping device. One of the components is a drawbar 3 being inserted into the housing in a bore 4. The drawbar 3 regulates the clamping mechanism, the function of which is not described here, between a locked state, in which the tool holder is firmly coupled to the clamping mechanism, and a released state in which the tool holder is released from the clamping device. The regulating of the clamping mechanism is performed by displacement of the drawbar 3 in the axial direction of the bore 4 in the housing. The displacement of the drawbar is in its turn performed by rotating a cam shaft 5, which extend through the housing and through an aperture in the drawbar, and which is provided with a cam formation which as desired can act on a rear surface of the aperture through the drawbar, which will displace the drawbar rearward, or on a forward surface of the aperture, which accordingly will displace the drawbar forward.

However, due to the cam formation having a locking cam surface as well as a releasing cam surface, the cam shaft will have a rather large cross-sectional dimension and, accordingly, the aperture of the drawbar has to be formed with a correspondingly large cross sectional dimension in order to accommodate the cam shaft with its cam formation. As a result, the drawbar will be formed with rather large cross-sectional dimensions since also the leg portions, which connect the forward and rear portions of the drawbar and are situated on a respective side of the drawbar aperture, must have a certain cross-sectional dimension in order to withstand the forces that will occur. This has the effect that with the commonly used dimensions of the mounting shanks for tools and tool holders, the drawbar cannot be inserted from the forward end of the clamping device since the passage will be too small. In the herein disclosed prior art clamping device this problem has been solved by mounting a separate sleeve 6 within the bore 4 of the housing which will define the shank bore for the mounting shank of the tool holder. Accordingly, the drawbar is mounted into the housing prior to mounting the shank bore sleeve 6.

One problem with such a solution is that the costs for manufacturing the clamping device will increase. Another problem is that using a separate shank bore sleeve will introduce one further component having its own manufacturing tolerances, which will deteriorate the precision of the machining work performed by means of the tool.

Reference is first made to FIGS. 4 and 5 in which a clamping device 10 according to the present disclosure and a tool holder 11 coupled to a forward end of the clamping device are illustrated in a perspective view. The tool holder is herein schematically illustrated such that only its cut-off, rear end is shown, but in practice some form of machining tool is connected to the tool holder, either integrated with the tool holder or as a separate connected part. A rear end the clamping device is provided with a mounting shank 12, which is arranged to be connected to for ex., a rotating spindle (not shown) of a working machine or the like. The clamping device includes a housing 13 having a circular cross-section and an inner bore 14. On its envelope surface the housing is provided with a hole 15 for mounting of a cam shaft 16 into the housing, and which gives access to an engagement formation in form of a hexagonal head 17 at an end of the cam shaft.

FIG. 5 is an exploded perspective view of the clamping device and tool holder 11 according to FIG. 4, showing the various components forming part of the clamping device. Like the clamping device, the tool holder is also provided with a mounting shank 18. In the illustrated embodiment the mounting shank 18 of the tool holder 11 is of a kind disclosed in U.S. Pat. No. 5,340,248, comprising a conical shank having an axial bore and a somewhat "triangular" or polygonal, non-circular cross section, which is adapted to be drawn into a correspondingly shaped mounting bore 14. The conical shape ensures a connection free from play in the radial as well as the axial direction, whereas the "triangular" or polygonal shape ensures an unrotatably fixation of the mounting shank in relation to the mounting bore.

In order to draw the mounting shank 18 of the tool holder into the mounting bore 14 of the clamping device, the latter is provided with a coupling mechanism including a drawbar 19, four compression springs 20, a thrust ring 21, a retainer ring 22, an elastic o-ring 23, a plurality of engagement segments 24 and a stop ring 25 arranged within the bore 14 of the housing 13. A sealing ring 26 is also arranged in a groove inside the inner bore of the housing such that it bears against and slides against the circumference of the drawbar 19. The hole 15 for the cam shaft 16 is formed through one side of the housing perpendicular to its centre axis 26 and in an assembled state the cam shaft 16 is inserted into the hole 15 and through an aperture 28 in the drawbar. The clamping device is also provided with a stop lug 29, which is attachable by means of a screw adjacent the hexagonal head 17 of the cam shaft.

Figure 7:
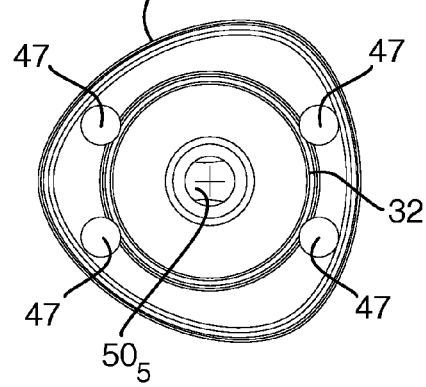
FIG. 7 is an end view from behind and left in FIG. 6.
Figure 8:
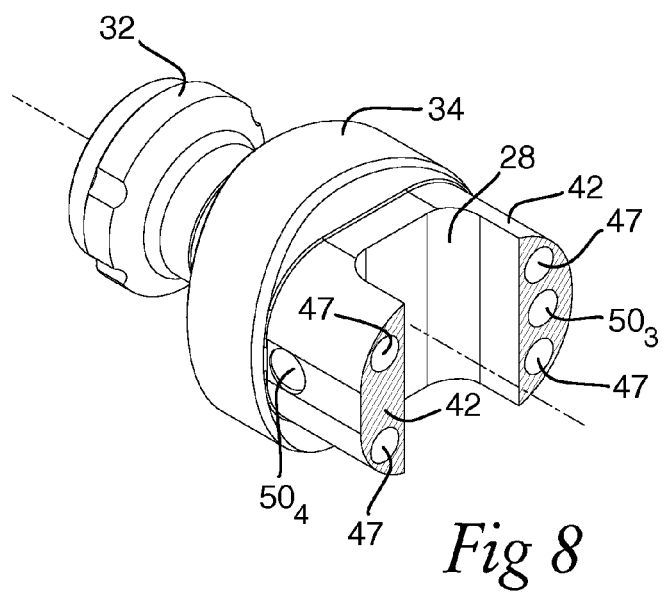
FIG. 8 is a cut through perspective view according to FIG. 6.

Referring now to FIGS. 6-8 in which the drawbar 19 is illustrated in a complete perspective view, an end view from the left, upper end according to FIG. 7 and a cut-off perspective view according to FIG. 8, respectively. As with prior art clamping devices of this kind, an aperture 28 is formed through the drawbar in a direction perpendicular to its longitudinal axis 30, through which the cam shaft extends in the assembled state of the clamping device. The forward end of the drawbar is formed as a projecting stud 31 having a drawhead 32, which in the rearward direction tapers into a shank portion 33, which in its turn is integrated with a large size portion 34. As is best seen from the end view of the forward end of the drawbar in FIG. 7, the large size portion 34 has a somewhat "triangular" or polygonal shape in cross section which conforms to the inner end of the mounting bore 14 such that a tight fit is achieved between the drawbar 19 and the inner surface of the mounting bore.

Figure 9:
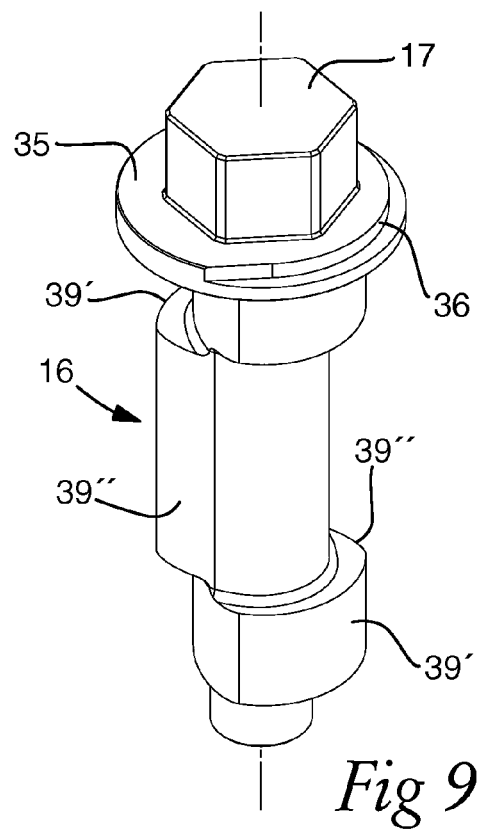
FIG. 9 is a perspective view of a cam shaft of the clamping device.
Figure 10:
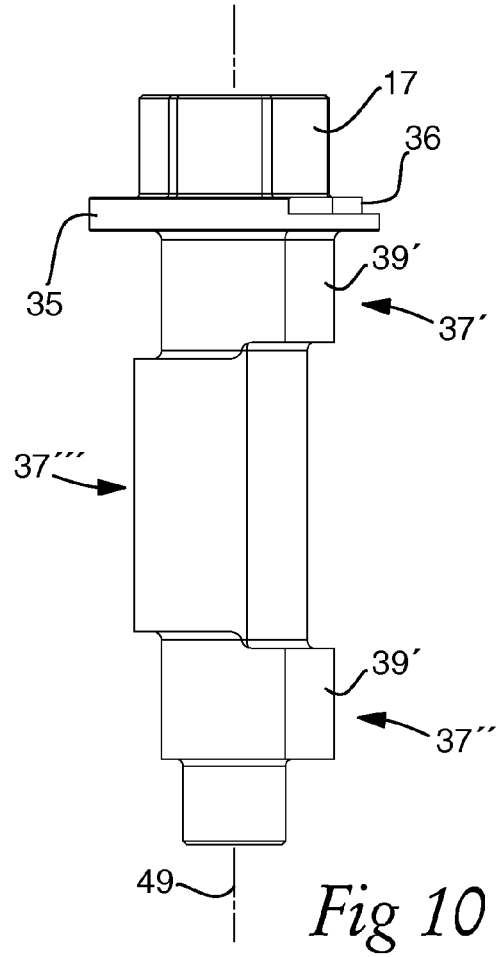
FIG. 10 is a side view according to FIG. 9.
Figure 11:
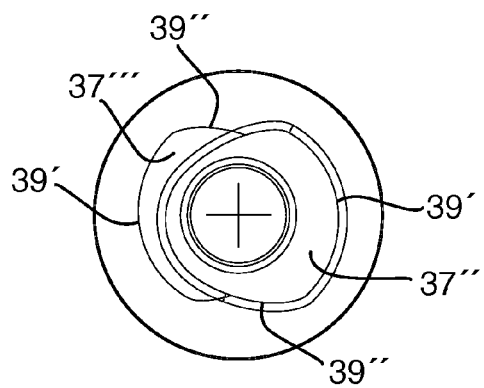
FIG. 11 is a view from below of the cam shaft in FIG. 9.

The cam shaft 16 is illustrated more in detail in a perspective view according to FIG. 9, a side view according to FIG. 10 and an end view according to FIG. 11, which is seen from below in FIGS. 9 and 10. In one end the cam shaft includes a head with an engagement formation in the form of a hexagonal head 17 arranged to be engaged by a hexagonal drive socket for setting of the cam shaft. Around the hexagonal drive socket the head is provided with a large, circular flange 35, which defines the depth of insertion into the housing and is provided with a recess 36 along a part of its circumferential edge which is adapted to interact with the stop lug 29 for restriction of the maximal turning angle of the cam shaft as well as prevent removal of the cam shaft from the housing.

The cam shaft includes three cam formations and more precisely first and second spaced apart cam formations 37', 37", which in the assembled state of the clamping device are journalled in seating apertures 38 in the housing on opposite sides of the drawbar, as is seen from FIGS. 12, 13, and which are identically shaped and positioned in relation to each other, as well as an intermediate third cam formation 37'" located between the first and second cam formations, which is identical shaped but angularly displaced by 180° in relation to the first and second cam formations and arranged to be positioned within the aperture 28 of the drawbar. Each of the cam formations includes, as is best seen from FIG. 11, a first cam surface 39', each having the same cam pitch per angular measure, as well as a second cam surface 39", each having the same cam pitch per angular measure.

More precisely, upon rotation of the cam shaft in a clockwise direction (as seen when viewing the hexagonal head 17) the first cam surfaces 39' of the first and second cam formations 37', 37" being operable to displace the cam shaft rearward by acting on a forward surface 40' (see FIGS. 12,13) of the seating apertures 38 whereas the first cam surface 39' of the third cam formation 37'" being operable to displace the drawbar rearward by acting on a rear surface 41" of the drawbar aperture 28 in order to urge the drawbar rearward to a locked position, in which it firmly locks the tool holder shank to the clamping device, and upon rotation of the cam shaft in a counter clockwise direction the second cam surfaces 39" of the first and second cam formations 37', 37" being operable to displace the cam shaft forward by acting on a rear surface 40" of the seating apertures 38 whereas the second cam surface 39" of the third cam formation 37'" being operable to displace the drawbar forward by acting on a forward surface 41' of the cam shaft aperture 28 in order to positively displace the drawbar forward to an unlocked position in which the tool holder shank is releasable from the clamping device.

Since the cam shaft 16 is to be inserted through the aperture 28 from one side of the drawbar, as is illustrated in FIGS. 12, 13, the aperture has to have a sufficient large cross-sectional dimension in order to let the cam shaft through. That condition is one of the determinant factors for how large the largest cross sectional dimension of the drawbar will be, since two leg portions 42, which interconnect the forward and rear portions of the drawbar with each other, has to have a sufficient cross-sectional dimension in order to withstand the large forces that the drawbar is subjected to during clamping of a tool holder. Accordingly, in order to restrict the cross-sectional dimension of the drawbar to such an extent that it can be inserted into the housing through the clamping bore from the forward end of the housing, it is also necessary to restrict the largest cross sectional dimension of the cam shaft. According to the disclosure, this is achieved by providing the cam shaft with three separate cam formations. More precisely, as is described above, first and second cam formations 37', 37" arranged to act on bearing surfaces 40', 40" arranged in opposite seating apertures 38 in the housing, as well as a third cam formation 37''' being positioned between and facing in the opposite direction in relation to the first and second cam formations and acting on bearing surfaces 41', 41" arranged within the aperture 28 of the cam shaft. In this way the cam formations can be made smaller than they normally would have to be for displacing the tool holder the required distance in order to clamp it securely, since the displacement distance generated by the opposite facing cam formations will add to each other.

Figure 14:
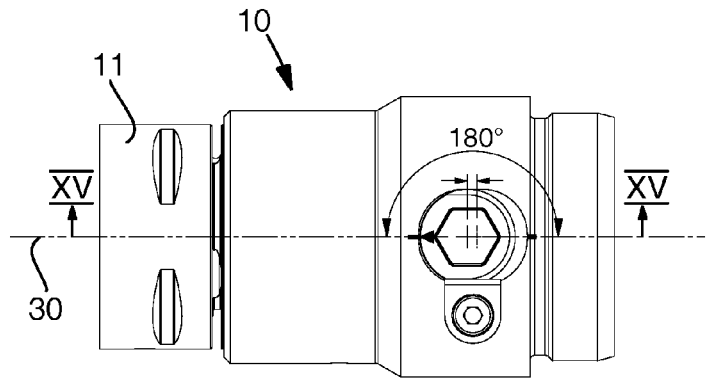
FIG. 14 is a side view of the clamping device and a tool holder in an initial unlocked or released state.
Figure 15:
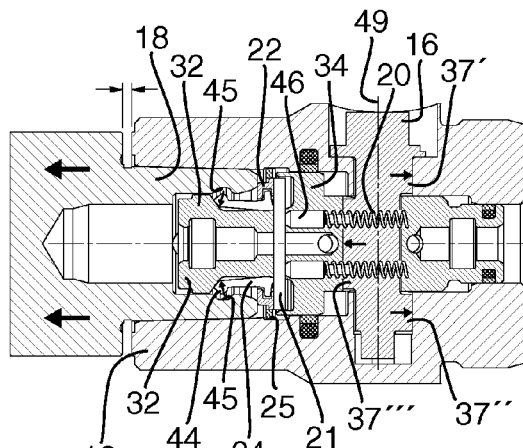
FIG. 15 is a longitudinal cross-section through the clamping device and the tool holder, along the line XV-XV in FIG. 14, in the unlocked or released state.

Reference is now made to FIGS. 14-18 in which is illustrated an unlocked state when the tool holder just has been inserted with its mounting shank 18 into the mounting bore 14 of the clamping device or is to be removed from the clamping device. FIG. 14 is a side view of the assembled tool holder 11 and the clamping device 10 with the cam shaft 16 rotated to a counter clockwise end position in which the tool holder is unlocked from the clamping device. FIG. 15 is a cross-section along the line XV in FIG. 14, i.e. along the longitudinal or centre axis of the tool holder 11 and the clamping device 10 in an assembled state with all its components mounted in place. The clamping device is here in an initial state when the tool shank 18 just has been inserted into the mounting bore but before the cam shaft 16 has been activated such that the tool shank has been coupled to the clamping device and drawn with a large force into the mounting bore of the housing 13. As can be seen, the engagement segments 24 are mounted around the drawbar in an area between the draw head 32 of the drawbar and the polygonal shaped portion 34 of the drawbar.

In the assembled state a space is formed between an inner surface of an engagement bore in the rear end of the tool holder and this area. The engagement segments 24 are held in place by means of an outward extending flange portion 43 of each engagement segment being in engagement with an inner groove inside the retainer ring 22, and the elastic o-ring 23, which is not seen in this view, is positioned in an outward facing groove formation in the rear end of the engagement segments. The forward ends of the engagement segments are formed with outward directed engagement flanges 44, which are arranged to engage with an inner engagement groove 45 inside the engagement bore of the tool holder, but are in this initial state out of engagement with the engagement groove. Moreover, compression springs 20 are mounted in each of the four spring bores in the forward end of the drawbar, as visible in FIGS. 7 and 8, such that pressure tips 46 of each compression spring presses against the thrust ring 21 and forces it in the forward direction against the stop ring 25.

It is to be noted that the compression springs 20 and the pressure tips 46 as shown are not situated in the same plane as the rest of the cross-sectional view but their positions are shown in this view for illustrative purpose. In reality, the compression springs 20 are positioned closer to the viewer than the section plane and are inserted into spring bores 47, as seen in FIGS. 7, 8, and extend within the leg portions 47 of the drawbar. One advantage with positioning the compression springs 20 in bores within the drawbar is that the overall length of the drawbar, and thereby also the clamping device, can be made shorter than prior art drawbars and clamping devices since then it is not necessary to make room for any spring means external of the drawbar. The pressure force of the compression springs and their pressure tips act to displace the thrust ring 21 as well as the retainer ring 22 and the engagement segments 24 forward towards the stop ring 25. In this unlocked state the cam shaft is rotated such that the first and second cam portions 37', 37" act to displace the cam shaft 16 in a direction forward and the third cam portion 37''' act on a forward bearing surface of the aperture in the drawbar and, accordingly, the drawbar will be displaced in a forward direction.

Figure 16:
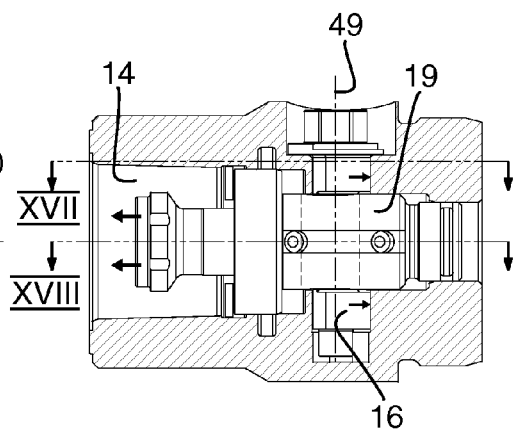
FIG. 16 is a partly cut through view of the clamping device according to FIG. 15, but without the tool holder and the coupling mechanism.
Figure 17:
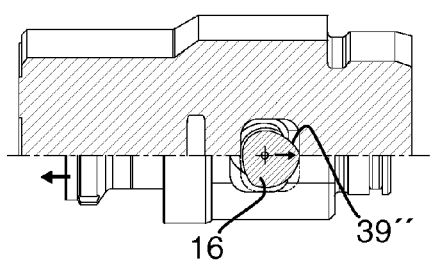
FIG. 17 is a longitudinal section along the line XVII in FIG. 16.
Figure 18:
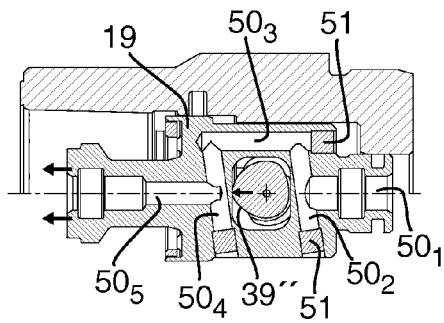
FIG. 18 is a longitudinal cross-section along the line XVIII in FIG. 16.

FIG. 16 is a partial longitudinal cross-section according to FIG. 15 but with the clamping mechanism removed and the drawbar 19 and the cam shaft 16 shown in side view, whereas FIGS. 17 and 18 are longitudinal cross-sections along the lines XVII and XVIII, respectively, in FIG. 16. As can be seen from FIG. 17, the second cam surface 39" of the first cam portion acts to displace the cam shaft 16 in the forward direction, whereas in FIG. 18 can be seen that the second cam surface 39" of the third cam formation acts to displace the drawbar 19 in the forward direction. FIG. 18 also illustrates a system of fluid channels for cooling medium through the drawbar, which will be described more in detail later.

From the initial state according to FIGS. 14-18, the cam shaft can be rotated maximum about 180° from the unlocked position to a locked position, as is illustrated in FIGS. 19-23, in which the first cam surfaces 39' of the first and second cam formations 37', 37" act on the forward surfaces of the seating apertures of the housing, which will displace the cam shaft 16 rearward, whereas the first cam surface 39' of the third cam formation 37''' will act on the rear surface of the drawbar aperture 28 and forces the drawbar 19 rearwards.

Figure 19:
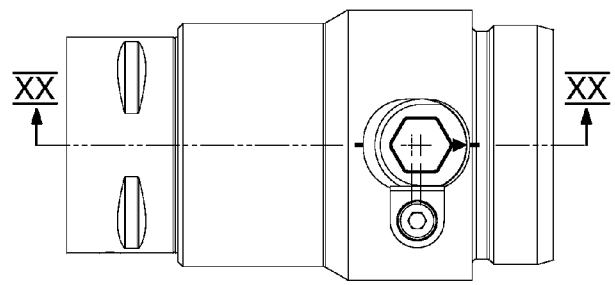
FIG. 19 is a side view of the clamping device and a tool holder in a locked or clamped state.
Figure 20:
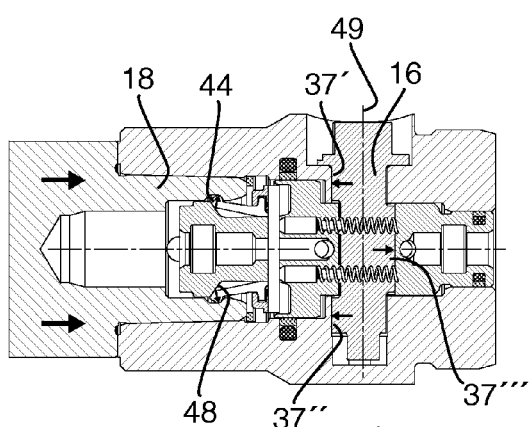
FIG. 20 is a longitudinal section through the clamping device and the tool holder, along the line XX-XX in FIG. 19, in the locked or clamped state.

This locked position is illustrated in a longitudinal cross-section along the center axis according to FIG. 20 along the line XX in FIG. 19. As can be seen from this figure, the thrust ring 21, the retainer ring 22 and the engagement segments 24 are still pushed forward toward the stop ring 25 by means of the compression springs 20, while the drawbar 19 is drawn rearward by means of the cam shaft 16 as described above. This has the effect that the engagement segments 24 will be displaced outwards in relation to the drawbar by that the forward ends of the engagement segments will slide on a rearward facing beveled surface 48 of the drawhead 32. In this way engagement flanges 44 on the forward ends of the engagement segments will be displaced outwards and go into engagement with an engagement groove 49 (FIG. 20) inside the engagement bore of the tool holder such that the tool holder shank 18 will be drawn by means of the drawbar 19 into firm bearing against the surfaces of the mounting bore 14 in the housing.

Figure 21:
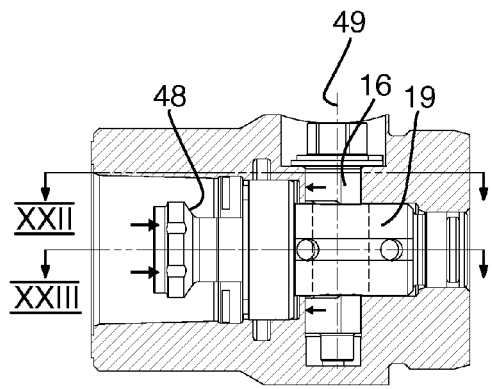
FIG. 21 is a partly cut through view of the clamping device according to FIG. 20, but without the tool holder and the coupling mechanism.
Figure 22:
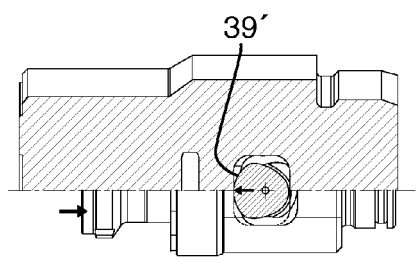
FIG. 22 is a longitudinal cross-section along the line XXII in FIG. 21.
Figure 23:
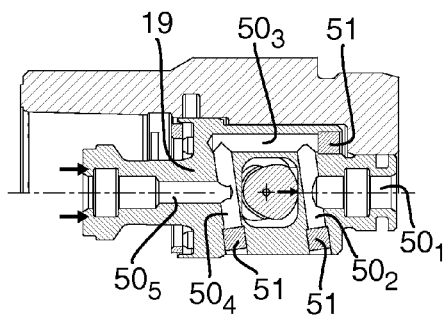
FIG. 23 is a longitudinal cross-section along the line XXIII in FIG. 21.

In analogy with the FIGS. 16-18, FIG. 21 is a partial longitudinal cross-section according to FIG. 20 but with the clamping mechanism removed and the drawbar 19 and the cam shaft 16 shown in side view, whereas FIGS. 22 and 23 are longitudinal sections along the lines XXII and XXIII, respectively, in FIG. 21. As can be seen from FIG. 22, the first cam surface 39' of the first cam portion acts to displace the cam shaft 16 in the rearward direction, whereas in FIG. 23 can be seen that the first cam surface 39' of the third cam formation acts to displace the drawbar 19 in the rearward direction. One consequence with a cam shaft according to the invention, is that the cam shaft will not only displace the drawbar 19 in the forward or rearward direction when rotating the cam shaft, also the cam shaft 16 itself will be somewhat displaced in the same direction as the drawbar. This is apparent when comparing FIGS. 15, 16 with FIGS. 20, 21 and looking e.g. at the center axis 49 of the cam shaft.

The clamping device as disclosed herein is provided with a system of fluid channels for distribution of cooling medium, liquid or gas, from the rear end of the clamping device to the tool holder. One difficulty with providing such a cooling system is that it is not desired that the fluid passes through the space where the cam shaft 16 is accommodated as it could be difficult to seal the cam shaft for preventing leakage of cooling fluid. Another problem is that some form of lubricant is normally used between the sliding surfaces of the cam shaft and the drawbar, which lubricant could be washed away if a cooling medium flows through there. These problems have been overcome by arranging the fluid channels entirely inside the drawbar 19 from its rear end to its forward end. The fluid channels are best seen in FIGS. 18 and 23, but are also partly visible in FIGS. 6, 7, 8, 15, 16, 20 and 21. The fluid channel system has a first blind channel $50_1$ from the rear end of the drawbar concentric with its center axis 30 which is terminated before reaching the drawbar aperture 28, where it debouches into a second blind channel $50_2$, which extends from one side surface of the drawbar and in an angle transverse to the center axis but is terminated before reaching the opposite side surface of the drawbar. The second blind channel $50_2$ debouches into a third blind channel $50_3$, which extends through one of the leg portions 42 of the drawbar in parallel to the center axis from a rear surface of the drawbar but is terminated before reaching a forward surface. The third blind channel $50_3$ debouches into a fourth blind channel $50_4$, which extends from one side surface of the drawbar and in an angle transverse to the centre axis but is terminated before reaching the opposite side surface of the drawbar. The fourth blind channel $50_4$ in turn debouches into a fifth blind channel $50_5$, which extends from the forward end of the drawbar concentric with its center axis, which is terminated before reaching the drawbar aperture 28.

The second, third and fourth blind channels $50_2$, $50_3$ and $50_4$ are sealed by means of plug 51 close to their respective openings at the surface of the drawbar in order to provide a closed channel system through the drawbar.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A clamping device for releasably holding a tool holder shank formed with an engagement bore in a rear end, comprising:
  a housing having a forwardly facing surface and a bore intersecting the forwardly facing surface and extending rearward therefrom for receiving the tool holder shank;
  a drawbar mounted reciprocally movable inside the housing and which in a forward end is provided with an engagement device arranged to engage with an engagement formation inside the engagement bore of the tool holder shank, the drawbar being formed with a drawbar aperture extending through the drawbar in a transverse direction in relation to a longitudinal axis of the same, wherein compression springs, for urging the engagement device in a forward direction, are accommodated in spring bores formed in the drawbar; and
  a cam shaft extending through the drawbar aperture and including a cam formation, wherein the cam shaft is rotatably journalled in the housing and arranged to impart an axial displacement to the drawbar in relation to the housing by the cam formation when rotating the cam shaft, the cam shaft including first and second spaced apart cam formations journalled in seating apertures in the housing on opposite sides of the drawbar and which are identically shaped and positioned in relation to each other, and an intermediate third cam formation located between the first and second cam formations which is angularly displaced in relation to the first and second cam formations and positioned within the aperture of the drawbar, wherein each of the cam formations includes a first cam surface and a second cam surface, wherein the first cam surfaces of the first and second cam formations being operable to displace the cam shaft rearward by acting on a forward surface of the seating apertures, the first cam surface of the third cam formation being operable to displace the drawbar rearward by acting on a rear surface of the drawbar aperture, and the second cam surfaces of the first and second cam formations being operable to displace the cam shaft forward by acting on a rear surface of the seating apertures whereas the second cam surface of the third cam formation being operable to displace the drawbar forward by acting on a forward surface of the drawbar aperture, and wherein the drawbar is insertable into the bore through the forwardly facing surface whereas the cam shaft is insertable into the drawbar aperture through one of the seating apertures.

2. The clamping device according to claim 1, wherein the third cam formation is identically shaped in relation to the first and second cam formations.

3. The clamping device according to claim 1, wherein the third cam formation is displaced 180° in relation to the first and second cam formations.

4. The clamping device according to claim 1, wherein fluid channels, for transferring of cooling medium, are arranged within the drawbar from its rear end to its forward end without passing through its aperture.

* * * * *